(12) United States Patent
Hall et al.

(10) Patent No.: US 11,466,734 B2
(45) Date of Patent: Oct. 11, 2022

(54) DRIVE DEVICE

(71) Applicant: AUDI AG, Ingolstadt (DE)

(72) Inventors: Matthew David Hall, Marbach am Neckar (DE); Guido Schiedt, Leutenbach (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 17/283,933

(22) PCT Filed: Dec. 13, 2019

(86) PCT No.: PCT/EP2019/085038
§ 371 (c)(1),
(2) Date: Apr. 8, 2021

(87) PCT Pub. No.: WO2020/126886
PCT Pub. Date: Jun. 25, 2020

(65) Prior Publication Data
US 2021/0396277 A1 Dec. 23, 2021

(30) Foreign Application Priority Data

Dec. 20, 2018 (DE) ...................... 10 2018 222 514.1

(51) Int. Cl.
*F16D 25/0638* (2006.01)
*B60K 6/387* (2007.10)

(52) U.S. Cl.
CPC .......... *F16D 25/0638* (2013.01); *B60K 6/387* (2013.01); *B60Y 2200/92* (2013.01); *F16D 2300/22* (2013.01)

(58) Field of Classification Search
CPC ............. F16D 25/0638; F16D 2300/22; F16D 25/123; F16D 25/14; F16D 13/72; F16D 13/74; F16D 25/06; F16D 25/062; F16D 25/063; F16D 25/0635; B60K 6/387; B60K 2006/4825
See application file for complete search history.

(56) References Cited

U.S. PATENT DOCUMENTS

| 5,057,128 A | 10/1991 | Panzica et al. |
| 5,158,582 A | 10/1992 | Onitsuka et al. |

(Continued)

FOREIGN PATENT DOCUMENTS

| CN | 103216572 A | 7/2013 |
| CN | 107850134 A | 3/2018 |

(Continued)

OTHER PUBLICATIONS

Machine translation of DE 19833378 A1 (Year: 1999).*

(Continued)

*Primary Examiner* — Timothy Hannon
*Assistant Examiner* — Farhana Pervin
(74) *Attorney, Agent, or Firm* — Maier & Maier, PLLC

(57) ABSTRACT

A drive device with a drive unit which has an output shaft and is mechanically connected to a driven shaft of the drive device via a clutch. At least one hydraulic channel and one hydraulic cylinder flow-connected to the hydraulic channel are formed in the output shaft, wherein a hydraulic piston coupled to the clutch for operating the same is displaceably arranged in the hydraulic cylinder.

8 Claims, 2 Drawing Sheets

(56) References Cited

U.S. PATENT DOCUMENTS

| | | | | |
|---|---|---|---|---|
| 6,443,286 | B1* | 9/2002 | Bratel | F16D 25/14 |
| | | | | 192/52.4 |
| 8,602,940 | B2* | 12/2013 | Kuwahara | B60K 6/48 |
| | | | | 477/86 |
| 10,167,907 | B2* | 1/2019 | Satoyoshi | F16H 57/0471 |
| 2011/0294620 | A1 | 12/2011 | Pruitt et al. | |
| 2017/0268649 | A1* | 9/2017 | Matsuda | F16H 45/02 |

FOREIGN PATENT DOCUMENTS

| | | | |
|---|---|---|---|
| CN | 108138900 A | 6/2018 | |
| CN | 108349368 A | 7/2018 | |
| DE | 815 151 B | 9/1951 | |
| DE | 37 11 490 A1 | 10/1987 | |
| DE | 38 38 865 A1 | 6/1989 | |
| DE | 198 33 378 A1 | 12/1999 | |
| DE | 10 2004 027 149 A1 | 7/2005 | |
| DE | 10 2014 205 506 A1 | 10/2014 | |
| DE | 10 2015 220 596 A1 | 4/2017 | |
| EP | 2 504 597 B1 | 5/2014 | |
| FR | 3058098 A1 * | 5/2018 | B60K 6/387 |

OTHER PUBLICATIONS

Examination Report dated Nov. 21, 2019 in corresponding German application No. 10 2018 222 514.1; 12 pages including Machine-generated English-language translation.

International Search Report dated Mar. 31, 2020 in corresponding International application No. PCT/EP2019/085038; 6 pages.

Written Opinion of the International Searching Authority dated Mar. 31, 2020 in corresponding International application No. PCT/EP2019/085038; 13 pages.

International Preliminary Report on Patentability dated Jun. 16, 2021 in corresponding International application No. PCT/EP2019/085038; 13 pages.

Office Action dated Dec. 30, 2021, in connection with corresponding Chinese Application No. 201980079377.1 (13 pp., including machine-generated English translation).

* cited by examiner

DRIVE DEVICE

FIELD

The disclosure relates to a drive device with a drive unit which has an output shaft and is mechanically connected to a driven shaft of the drive device via a clutch.

BACKGROUND

The prior art includes document US 2011/0294620 A1, for example. This document relates to a power transmission system for hybrid vehicles. Document DE 815 151 B relates to a transmission for motor vehicles with a hydraulic torque converter and a planetary gear train.

Furthermore, the document DE 10 2004 027 149 A1, which describes a torsional vibration damper, is known from prior art. Furthermore, the publications DE 10 2014 205 506 A1 and EP 2 504 597 B1 are known from prior art.

SUMMARY

It is the object of the invention to propose a drive device with a drive unit having an output shaft, which has advantages over known drive devices, particularly an extremely compact design.

This object is achieved according to the disclosure by a drive device. At least one hydraulic channel and one hydraulic cylinder flow-connected to the hydraulic channel are formed in the output shaft, wherein a hydraulic piston coupled to the clutch for operating the same is displaceably arranged in the hydraulic cylinder.

The drive device is used to drive the motor vehicle and thus to provide a torque that is directed at driving the motor vehicle. The drive device has the drive unit to provide the drive torque, which unit is designed, for example, as an internal combustion engine. Alternatively, however, there can also be an embodiment of the drive device in which the drive unit is an electrical machine. In any case, the drive unit comprises the output shaft via which it provides the drive torque. The output shaft is mechanically connected to the driven shaft of the drive device, that is, via the clutch. This means that the operative connection between the output shaft and the driven shaft is selectively established or interrupted.

When the clutch is in a first switching position, the operative connection between the output shaft and the driven shaft is established, for example the output shaft and the driven shaft are rigidly coupled to one another when the clutch is in the first switching position. In a second switching position of the clutch, however, the output shaft and the driven shaft are uncoupled from one another, in particular completely, so that no torque is transmitted between the output shaft and the driven shaft or vice versa by means of the clutch. The drive device provides the drive torque via the driven shaft. For example, the driven shaft is mechanically connected to at least one wheel axle of the motor vehicle and is at least temporarily or permanently in operative connection therewith. The driven shaft is preferably permanently connected to a transmission, in particular a gear change transmission, of the drive device. The driven shaft can be mechanically connected to the wheel axle via the transmission.

The clutch is a hydraulically operated clutch. In order to make the drive device particularly compact, the actuator used to actuate the clutch should be at least partially integrated into the output shaft of the drive unit. At least the hydraulic channel and the hydraulic cylinder are formed in the output shaft. The hydraulic piston is displaceably arranged in the hydraulic cylinder. The hydraulic piston is at least temporarily mechanically coupled to the clutch, such that the clutch can be operated using the hydraulic piston. Different positions of the hydraulic piston within the hydraulic cylinder means that there are different switching positions of the clutch, for example, the first switching position or the second switching position.

The hydraulic channel opens into a hydraulic chamber which is delimited jointly by a cylinder wall of the hydraulic cylinder and the hydraulic piston. When the hydraulic piston is displaced, the volume of the hydraulic chamber changes. Conversely, a change in the volume of the hydraulic chamber causes a displacement of the hydraulic piston in the hydraulic cylinder and thus an operation of the clutch. A hydraulic fluid can be fed to or removed from the hydraulic chamber via the hydraulic channel formed in the output shaft.

For example, the hydraulic cylinder and thus the hydraulic chamber is connected to a hydraulic pressure source via the hydraulic channel, for example via a control valve, such that the desired switching position on the clutch can be set by targeted supply and removal of hydraulic fluid into or from the hydraulic cylinder. The design of the hydraulic channel and the hydraulic cylinder in the output shaft and the arrangement of the hydraulic piston in the hydraulic cylinder formed in the output shaft result in a particularly compact design of the drive device.

It is particularly preferred that some sections of the output shaft are mounted in the driven shaft. This means that the output shaft partially engages in the driven shaft, for example with one of its ends. The output shaft is mounted with respect to the driven shaft, such that it is ultimately mounted in the driven shaft. The output shaft can be mounted directly on the driven shaft, for which purpose a bearing, for example, engages with the output shaft on the one hand and with the driven shaft on the other. However, the output shaft can also just be supported indirectly with respect to the driven shaft, for example in that the output shaft is mounted by means of a first bearing on a housing of the drive device on which the driven shaft is also mounted, namely by means of a second bearing. By mounting the output shaft in the driven shaft, a particularly compact design of the drive device is achieved, particularly in the axial direction with respect to an axis of rotation of the output shaft or an axis of rotation of the driven shaft.

In another embodiment of the invention, the output shaft is mounted on and/or in the driven shaft via an intermediate shaft, wherein the output shaft is positively and/or non-positively coupled to the intermediate shaft and the intermediate shaft is mounted in the driven shaft by means of at least one bearing. It has already been explained above that some sections of the output shaft can be mounted in the driven shaft. In addition, it is now clear that this mounting should be provided via the intermediate shaft. This means that the output shaft is only mounted indirectly on the driven shaft, that is, via the intermediate shaft.

For this purpose, the output shaft is form-fittingly and/or non-positively connected to the intermediate shaft. The form-fitting connection can be established, for example, by means of a toothing of the output shaft which meshes with a counter-toothing of the intermediate shaft in order to fix the output shaft and the intermediate shaft against one another at least in the circumferential direction. Additionally or alternatively, the non-positive connection between the output shaft and the intermediate shaft can be established.

For example, the non-positive connection is established in that the output shaft is pushed in the axial direction against the intermediate shaft, such that a contact surface of the output shaft rests against a mating contact surface of the intermediate shaft with a friction fit.

To implement the indirect mounting of the output shaft with respect to the driven shaft, the intermediate shaft is mounted in and/or on the driven shaft, that is, via the at least one bearing. The intermediate shaft can be mounted either directly or only indirectly on the driven shaft. For this, we refer to the explanations regarding the mounting of the output shaft in the driven shaft. These can be used analogously. Particularly preferably, the intermediate shaft is rigidly or non-rotatably connected to the output shaft and is directly rotatably mounted on the driven shaft. For example, the at least one bearing engages with an outer peripheral surface of the intermediate shaft on the one hand and with an inner peripheral surface of the driven shaft on the other hand. The at least one bearing is thus also arranged completely in the output shaft, so that a further reduction in the installation space of the drive device is achieved.

In another embodiment of the invention, the intermediate shaft is fastened to the output shaft in the axial direction by means of a fastening element. The intermediate shaft form-fittingly fastened to the output shaft is carried out using the fastening element. The fastening element pushes the intermediate shaft in the axial direction against the output shaft, that is, in such a manner that the contact surface rests against the mating contact surface in a frictionally engaged manner as already described above. The fastening element is in the form of a screw, for example, the head of which is supported on an end face of the intermediate shaft, whereas its thread is fastened to the output shaft or engages therein. The fastening element particularly preferably extends completely through the intermediate shaft in the axial direction. Thus, viewed in the axial direction, the head of the fastening element is, on the one hand, upstream of the intermediate shaft and its thread, on the other hand, is at least partially upstream of the intermediate shaft. Such a configuration ensures a particularly durable connection between the output shaft and the intermediate shaft.

In a further development of the invention, the hydraulic channel in the output shaft has an orifice on its side facing away from the hydraulic cylinder, which opening is formed in a lateral surface of the output shaft. The hydraulic channel therefore opens into the hydraulic chamber or the hydraulic cylinder on the one hand and, on the other hand, extends through the outer surface of the output shaft to form the orifice. The lateral surface is to be understood as an outer peripheral surface of the output shaft.

For example, the hydraulic channel has a first channel region and a second channel region, the first channel region on the one hand opening into the hydraulic cylinder and on the other hand merging or opening into the second channel region. The first channel region preferably runs continuously straight. For example, it runs parallel to the axis of rotation of the output shaft. The second channel region opens into the first channel region on the one hand and on the other hand extends through the lateral surface of the output shaft, forming the orifice. The second channel region in itself also preferably runs continuously straight. For example, the second channel region runs in the radial direction with respect to the axis of rotation of the output shaft, so that its longitudinal center axis intersects the axis of rotation. For example, the first channel region and the second channel region are each designed as a bore.

Such a configuration of the hydraulic channel is easy to produce and enables targeted operation of the clutch. The first channel region may be interrupted in the circumferential direction. For example, there are multiple hydraulic channels, which on the one hand open into the hydraulic cylinder and on the other hand extend through the lateral surface of the output shaft. The first channel regions of these multiple hydraulic channels are, for example, configured to be discrete from one another and to this extent are present in the output shaft at a distance from one another in the circumferential direction. The second channel regions, on the other hand, can be formed by a joint annular chamber which is designed to extend through the jacket surface in the output shaft. Such a continuous annular chamber in the circumferential direction ensures that hydraulic medium or hydraulic fluid is reliably applied to the hydraulic cylinder.

In the context of a further embodiment of the invention, the intermediate shaft can be coupled to at least one outer plate carrier of the clutch, particularly is designed in one piece therewith and/or made of the same material. This means that the output shaft is connected to the outer plate carrier only indirectly, that is, via the intermediate shaft. The outer plate carrier of the clutch is used to attach at least one outer plate, which is provided and configured to interact with at least one inner plate of the clutch. Particularly, the at least one outer plate and the at least one inner plate are arranged with respect to one another in such a way that they can be displaced towards one another in the axial direction by means of the hydraulic piston and can thereby be brought into frictional contact with one another. By interaction of the outer plate and the inner plate, a frictional connection can be established between the outer plate carrier and thus the intermediate shaft, and an inner plate carrier of the clutch which carries the at least one inner plate and is coupled to the driven shaft or formed by the same. This results in a particularly compact design of the drive device.

In another embodiment of the invention, the output shaft is coupled to at least one inner plate carrier of the clutch or at least partially forms the inner plate carrier. The inner plate carrier is used to hold the at least one inner plate. The inner plate carrier and the outer plate carrier can be non-positively coupled to one another through the interaction of the inner plate and the outer plate, so that ultimately the output shaft and the output shaft can be non-positively coupled to one another via the clutch. For example, the inner plate carrier is coupled to the driven shaft. However, it is particularly preferably formed by the driven shaft. This allows a further reduction in installation space for the drive device.

In a preferred development of the invention, a plate pack of the clutch has at least one outer plate connected in a rotationally fixed manner to the outer plate carrier and at least one inner plate connected in a rotationally fixed manner to the inner plate carrier and arranged on a side of the outer plate carrier facing away from the output shaft. The plate pack of the clutch is composed of the at least one outer plate and the at least one inner plate. A plurality of outer plates and a plurality of inner plates are particularly preferably provided in each case, particularly with as many outer plates as there are inner plates, and vice versa. The at least one outer plate is connected to the outer plate carrier in a rotationally fixed manner, whereas the at least one inner plate is connected to the inner plate carrier in a rotationally fixed manner. The plate pack is now arranged on the side of the outer plate carrier facing away from the output shaft.

This results in a direct connection of the inner plate carrier to the driven shaft, such that overall an extremely compact drive device is obtained.

In another embodiment of the invention, a coupling element configured to operate the plate pack engages on the one hand with the hydraulic piston and on the other hand with the plate pack and engages through the outer plate carrier. The coupling element is used to establish an operative connection between the hydraulic piston and the plate pack. In this respect, the coupling element rests on the one hand on the hydraulic piston and on the other hand at least temporarily against the plate pack. The coupling element may also be rigidly connected or attached to the hydraulic piston. Because the plate pack is arranged on the side of the outer plate carrier facing away from the output shaft, the coupling element extends through the outer plate carrier in order to establish the operative connection between the hydraulic piston and the plate pack. This implements the compact design of the drive device.

In an further development of the invention, the outer plate carrier has a first carrier element and a second carrier element to form a vibration damper, wherein the first carrier element is rigidly connected to the intermediate shaft and the second carrier element is non-rotatably connected to the at least one outer plate, and the first carrier element and the second Support element are connected to one another in an elastically damping manner The outer plate carrier is therefore composed of at least the first carrier element and the second carrier element. The first carrier element is rigidly coupled to the intermediate shaft and the second carrier element is non-rotatably coupled to the outer plate. The connection between the first carrier element and the second carrier element, however, is elastic, particularly torsionally elastic, such that the first carrier element and the second carrier element can be elastically rotated relative to one another in the circumferential direction with respect to the axis of rotation of the driven shaft or the output shaft. As a result, the vibration damper is formed between the intermediate shaft and the plate pack.

In other words, the vibration damper is completely integrated into the multi-plate clutch; particularly, the vibration damper is at least partially in overlap with the plate pack when viewed in the axial direction. For example, the first carrier element and the second carrier element are connected to one another in an elastically damping manner in the circumferential direction by means of at least one damping element. The damping element has, for example, the form of a spring, particularly a helical spring. At least sections of the damping element surround the plate pack in the circumferential direction, wherein the element particularly preferably overlaps the pack in the axial direction. This significantly reduces the installation space required for the drive device, particularly in the axial direction.

In another preferred embodiment of the invention, another drive unit is mechanically connected to the drive unit via the clutch. For example, the other drive unit is rigidly and/or permanently coupled to the driven shaft. This means that the other drive unit is or can be connected to the drive unit via the clutch and the vibration damper, if equipped. The other drive unit is, for example, of a type which is different from the type of drive unit. The other drive unit can also be in the form of an internal combustion engine or an electrical machine. If the drive unit is an internal combustion engine, the other drive unit is particularly preferably designed as an electrical machine, and vice versa. With the embodiment described, a hybrid drive device is implemented in a particularly simple manner.

Finally, within the scope of a further embodiment of the invention, it can be provided that the further drive unit is arranged next to the drive unit, in particular axially parallel. While the drive unit has the output shaft, the other drive unit has another output shaft. The output shaft and the other output shaft are now not arranged coaxially to one another, but rather next to one another, preferably parallel. Here, the other drive unit is at least partially or even completely overlapping with the drive unit, viewed in the axial direction with respect to the axis of rotation of the output shaft. For example, the other drive unit has for this purpose a smaller extension in the axial direction than the drive unit. The other drive unit is particularly preferably connected to the driven shaft of the drive device via at least one gear stage, particularly via a spur gear stage. In this way, a particularly compact design of the drive device, particularly in the axial direction, is achieved.

BRIEF DESCRIPTION OF THE FIGURES

The invention will be explained in greater detail below with reference to the exemplary embodiments depicted in the drawings, without this limiting the invention. Wherein.

DETAILED DESCRIPTION

Figure 1:
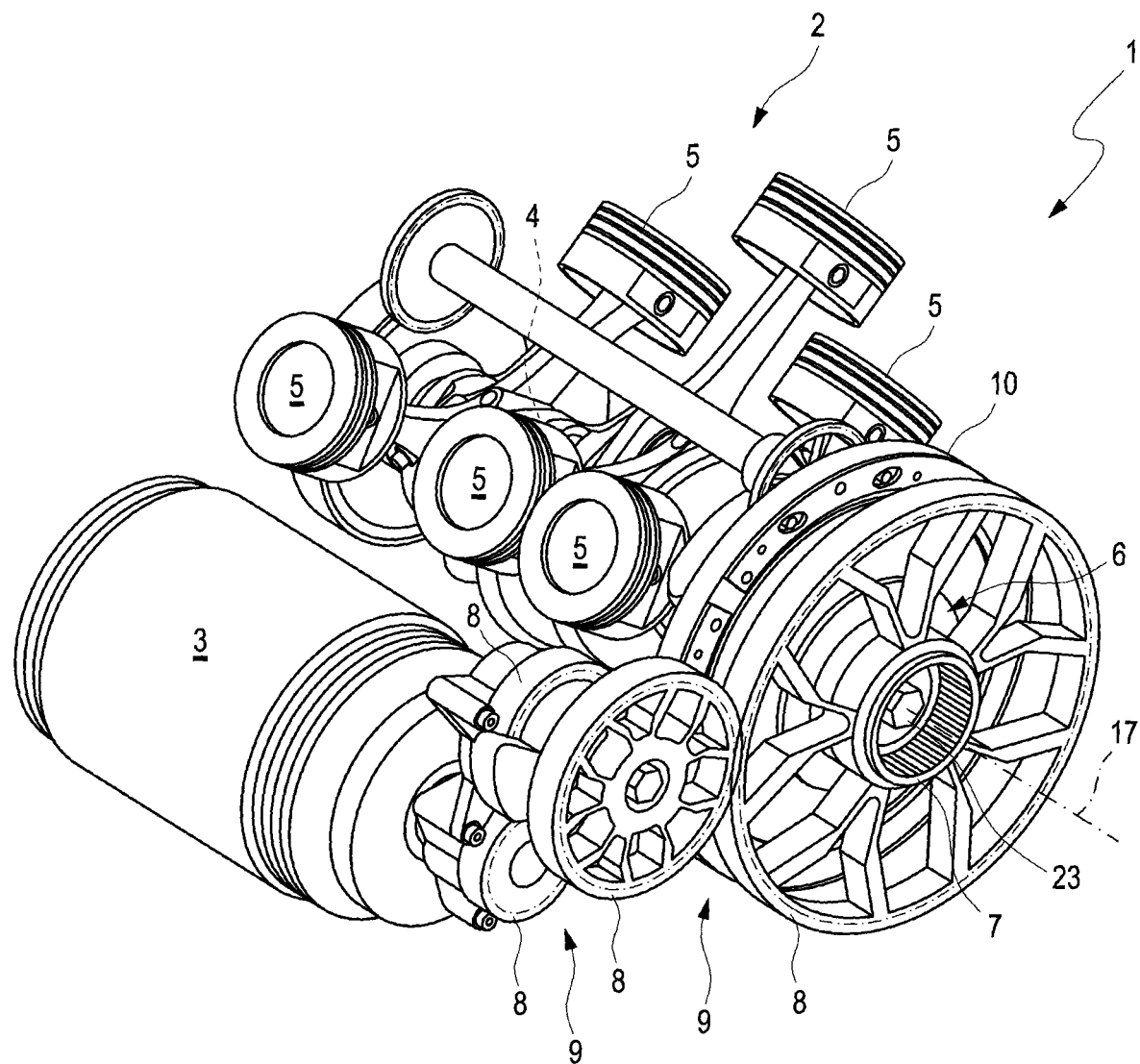
FIG. 1 shows a schematic view of a drive device with a drive unit and another drive unit.

FIG. 1 shows a schematic view of a drive device 1 which has a first drive unit 2 and a second drive unit 3. The first drive unit 2 is an internal combustion engine and the second drive unit 3 is an electrical machine. The first drive unit 2 has a crankshaft which serves as an output shaft 4. At least one piston 5 of the first drive unit 2 engages in a known manner with the output shaft 4. In the exemplary embodiment shown, there are several pistons 5, particularly six pistons 5. The output shaft 4 of the first drive unit 2 is connected to a driven shaft 7 of the drive device 1 via a clutch 6. The output shaft 4 and the driven shaft 7 are arranged coaxially to one another in the exemplary embodiment shown here.

A gear 8 is arranged on the driven shaft 7 in at least one gear stage 9, via which gear the second drive unit 3 is mechanically connected to the driven shaft 7, preferably rigidly and/or permanently. In the exemplary embodiment shown here, there are several gear stages 9, particularly two gear stages 9, each of which has two gear wheels 8. In the exemplary embodiment shown here, a vibration damper 10 is integrated into the clutch 6 of the drive device 1. This means that the two drive units 2 and 3 are mechanically connected to one another via the clutch 6 and the vibration damper 10 and can thus be coupled to one another.

Figure 2:
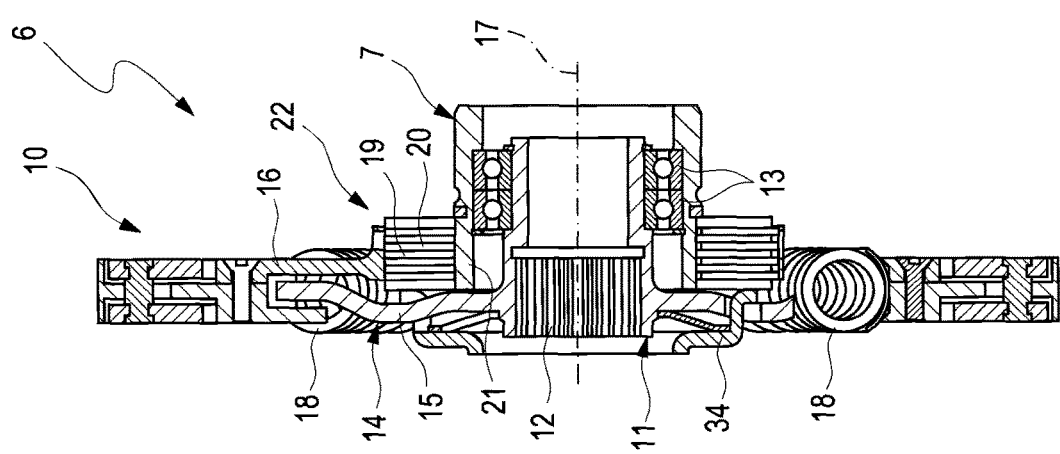
FIG. 2 shows a schematic longitudinal sectional view through a clutch of the drive device.

FIG. 2 shows a schematic longitudinal sectional view of the clutch 6 with the vibration damper 10 integrated therein. An intermediate shaft 11 is visible, which is provided and configured for coupling to the output shaft 4. Particularly, the intermediate shaft 11 has for this purpose a toothing 12, particularly an internal toothing, for coupling to the output shaft 4 or to a counter-toothing of the output shaft 4. It can be seen that the intermediate shaft 11 is rotatably mounted in the driven shaft 7, that is, on the driven shaft 7, by means of at least one bearing 13, in the embodiment shown here by several bearings 13. For this purpose, the bearing 13 rests on the inside against an outer peripheral surface of the intermediate shaft 11 and on the outside against an inner peripheral surface of the driven shaft 7.

The intermediate shaft 11 is coupled to an outer plate carrier 14 of the clutch 6. The outer plate carrier 14 has a first carrier element 15 and a second carrier element 16. The first carrier element 15 is rigidly and permanently connected to the intermediate shaft 11; particularly, the first rotary element 15 is formed in one piece with, and of the same material as, the intermediate shaft 11. The second carrier element 16 is connected to the first carrier element 15 in an elastically damping manner in the circumferential direction with respect to an axis of rotation 17 of the driven shaft 7, that is, via at least one damping element 18. In the exemplary embodiment shown here, multiple damping elements 18 are arranged in the peripheral direction at a spacing from one another. However, the can also be just a single damping element 18.

The second carrier element 16 is non-rotatably connected to at least one outer plate 19 of the clutch 6. There are preferably several outer plates 19, each of which is non-rotatably connected to the second carrier element 16. In addition to the at least one outer plate, the clutch 6 has at least one inner plate 20, which is non-rotatably connected to an inner plate carrier 21. In the exemplary embodiment shown here, the driven shaft 7 serves as the inner plate carrier 21. The at least one outer plate 19 and the at least one inner plate 20 together form a plate pack 22, which can be operated, particularly compressed, to establish an operative connection between the intermediate shaft 11 and the driven shaft 7.

It can be seen that, due to the integration of the vibration damper 10 in the clutch 6, a significant installation space reduction can be achieved in the axial direction, particularly because the at least one damping element 18 and the plate pack 22 overlap at least in some regions in the axial direction. Particularly, in the exemplary embodiment shown here, the at least one damping element 18 at least partially engages around the plate pack 22 in the circumferential direction. The vibration damper 10 shown here is particularly preferably designed in the manner of a two-mass flywheel.

Figure 3:
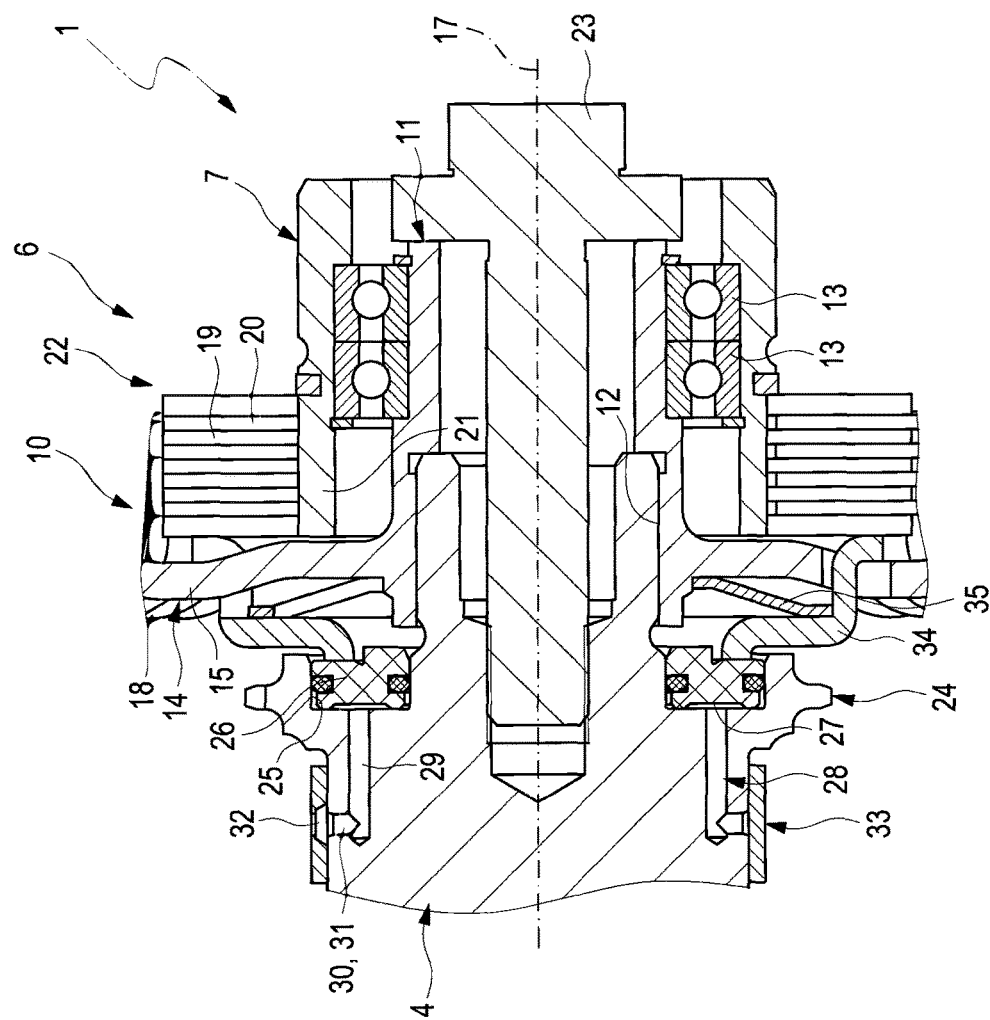
FIG. 3 shows a schematic detailed longitudinal sectional view through a region of the drive device.

FIG. 3 shows a schematic longitudinal sectional view of a region of the drive device 1, wherein particularly the output shaft 4 of the first drive unit 2, the clutch 6 with the integrated vibration damper 10, and the driven shaft 7 are depicted. It can be seen that the output shaft 4 is fastened to the intermediate shaft 11 by means of a fastening element 23. In addition to the toothing 12, which creates a positive connection between the output shaft 4 and the driven shaft 7, there is a non-positive connection between the output shaft 4 and the driven shaft 7 which is implemented using the fastening element 23.

The clutch 6 is actuated using an actuator 24 which has a hydraulic cylinder 25 formed in the output shaft 4 and a hydraulic piston 26 arranged in the hydraulic cylinder 25. The hydraulic cylinder 25 and the hydraulic piston 26 jointly delimit a hydraulic chamber 27 into which a hydraulic channel 28 opens, which channel is also formed in the output shaft 4. In the exemplary embodiment shown here, the hydraulic channel 28 has a first channel region 29 and a second channel region 30, wherein the first channel region 29 opens directly into the hydraulic chamber 27, whereas the second channel region 30 is only indirectly flow-connected to the hydraulic chamber 27 via the first channel region 29.

The first channel region 29 preferably is continuously straight. Particularly, it runs parallel to the axis of rotation 17. The second channel region 30 preferably is also continuously straight, but can be perpendicular to the axis of rotation 17. Starting from the first channel region 29, it extends radially outwards. Multiple hydraulic channels 28 can be present, such that there are multiple first channel regions 29 spaced apart from one another in the circumferential direction. The second channel regions 30 can be configured as a continuous annular channel 31 in the circumferential direction. This channel is in flow connection with a flow opening 32 which is arranged in a bearing, particularly a slide bearing. A region of the bearing can be seen which represents, for example, a bearing bush 33 or a slip ring. The bearing bush 33 rests tightly against an outer circumference of the output shaft 4, such that hydraulic fluid can be applied to the hydraulic chamber 27 via the hydraulic channel 28 from the flow opening 32.

The described embodiment of the drive device 1 has the advantage that it is extremely compact in the axial direction with respect to the axis of rotation 17, primarily due to the integration of the vibration damper 10 in the clutch 6. The clutch 6 is operated using the actuator 24, which comprises the hydraulic cylinder 25 and the hydraulic piston 26 for this purpose. The hydraulic piston 26 is connected to the plate pack 22 of the clutch 6 via a coupling element 34. The coupling element 34 extends through the outer plate carrier 14, particularly through the first carrier element 15, in the axial direction. In the embodiment shown here, there is also a spring element 35 which acts on the first carrier element 15 on the one hand and on the coupling element 34 on the other hand. The spring element 35 pushes the coupling element 34 in the direction of the hydraulic piston 26, particularly in such a way that the coupling element 35 rests against the hydraulic piston 26, preferably permanently. The spring element 35 pushes the coupling element 34 away from the plate pack 22, provided that the hydraulic piston 26 or its position allows this. The spring element 35 can accordingly also be called a return spring.

LIST OF REFERENCE NUMERALS 1 drive device
2 1st drive unit
3 2nd drive unit
4 output shaft
5 piston
6 clutch
7 driven shaft
8 gear
9 gear stage
10 vibration damper
11 intermediate shaft
12 toothing
13 bearing
14 outer plate carrier
15 1st carrier element
2nd carrier element
17 axis of rotation
18 damping element
19 outer plate
20 inner plate
21 inner plate carrier
22 plate pack
23 fastening element
24 actuator
25 hydraulic cylinder
26 hydraulic piston
27 hydraulic chamber
28 hydraulic channel
29 1st channel region
30 2nd channel region 31 annular channel
32 flow opening
33 bearing bush
34 coupling element
35 spring element

The invention claimed is:

1. A drive device with an output shaft having a drive unit which is mechanically connected to a driven shaft of the drive device via a clutch,
   wherein in the output shaft, at least one hydraulic channel and one hydraulic cylinder flow-connected to the hydraulic channel are formed,
   wherein a hydraulic piston coupled to the clutch is displaceably arranged in the hydraulic cylinder for operating the clutch,
   wherein the output shaft is mounted on the driven shaft via an intermediate shaft,
   wherein the output shaft is coupled to the intermediate shaft and the intermediate shaft is mounted in the driven shaft by at least one bearing
   wherein the intermediate shaft is coupled to at least one outer plate carrier of the clutch,
   wherein a plate pack of the clutch has at least one outer plate non-rotatably connected to the outer plate carrier and at least one inner plate non-rotatably connected to an inner plate carrier and is arranged on a side of the outer plate carrier facing away from the output shaft, and
   wherein a coupling element configured to operate the plate pack engages on a first side with the hydraulic piston and on a second side with the plate pack and extends through the outer plate carrier.

2. The drive device according to claim 1, wherein the hydraulic channel in the output shaft has an orifice on its side facing away from the hydraulic cylinder, which orifice is formed in a lateral surface of the output shaft.

3. The drive device according to claim 2, wherein the intermediate shaft is coupled to at least one outer plate carrier of the clutch.

4. The drive device according to claim 2, wherein the driven shaft is coupled to at least one inner plate carrier of the clutch or at least partially forms the inner plate carrier.

5. The drive device according to claim 1, wherein the driven shaft is coupled to at least one inner plate carrier of the clutch or at least partially forms the inner plate carrier.

6. The drive device according to claim 1, wherein the outer plate carrier has a first carrier element and a second carrier element to form a vibration damper, wherein the first carrier element is rigidly connected to the intermediate shaft and the second carrier element is non-rotatably connected to the at least one outer plate, and the first carrier element and the second carrier element are connected to one another in an elastically damping manner.

7. The drive device according to claim 1, wherein a second drive unit is mechanically connected to the drive unit via the clutch.

8. The drive device according to claim 7, wherein the second drive unit is arranged next to the drive unit.

* * * * *